(No Model.)

J. C. MURRAY.
SHOE OR GLOVE FASTENER.

No. 424,683. Patented Apr. 1, 1890.

WITNESSES:
J. A. E. Criswell
C. Sedgwick

INVENTOR:
J. C. Murray
By Munn & Co.
ATTORNEYS

N. PETERS, Photo-Lithographer, Washington, D. C.

UNITED STATES PATENT OFFICE.

JAMES CLARENCE MURRAY, OF SCRANTON, MISSISSIPPI.

SHOE OR GLOVE FASTENER.

SPECIFICATION forming part of Letters Patent No. 424,683, dated April 1, 1890.

Application filed December 13, 1889. Serial No. 333,627. (No model.)

*To all whom it may concern:*

Be it known that I, JAMES CLARENCE MURRAY, of Scranton, in the county of Jackson and State of Mississippi, have invented a new and useful Improvement in Shoe or Glove Buttoners, of which the following is a full, clear, and exact description.

My invention relates to an improved device especially adapted for buttoning shoes, but which may also be used for buttoning gloves, and has for its object to provide a device capable of rapid and convenient manipulation, and by the use of which a shoe or glove may be buttoned without the least damage to the button-holes.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
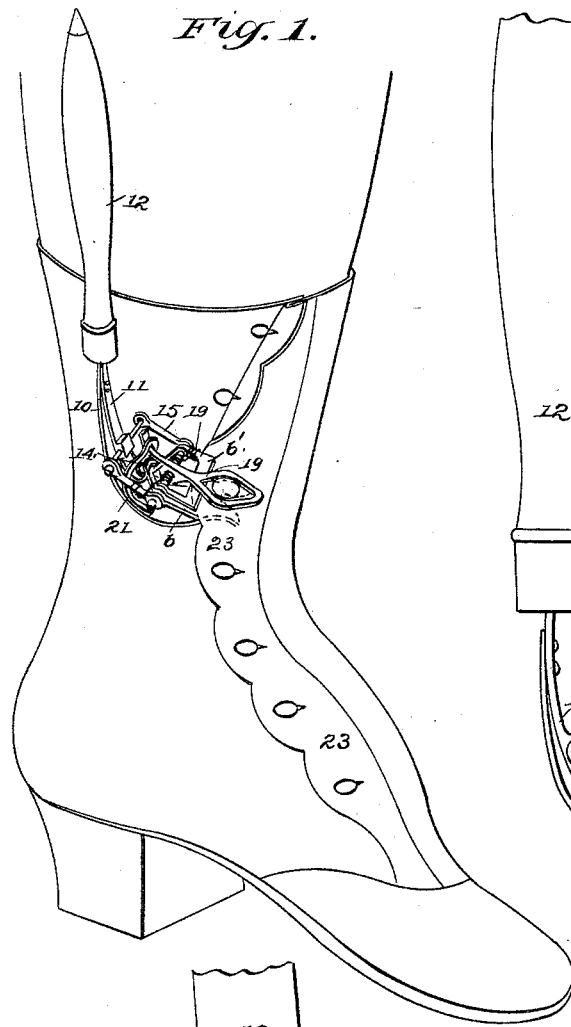
Figure 2:
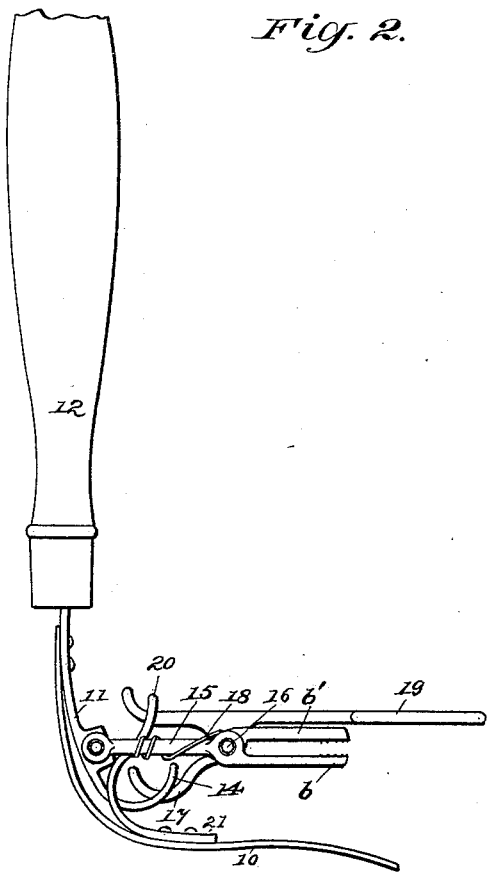
Figure 3:
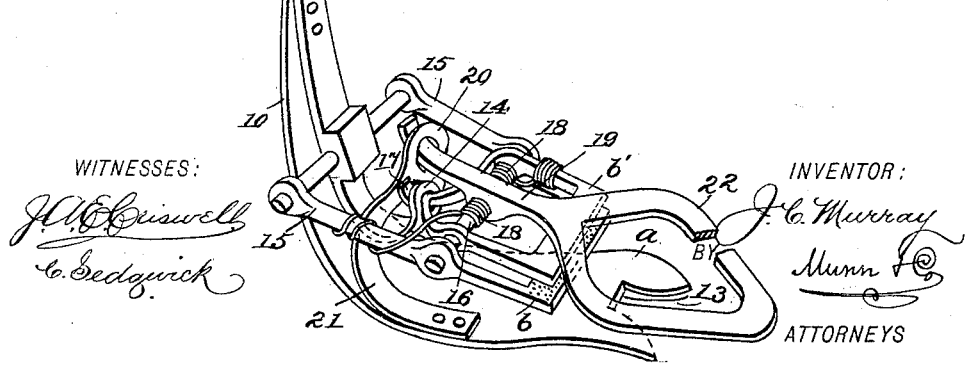

Figure 1 is a perspective view of the device applied to a shoe. Fig. 2 is a side elevation of the device enlarged; and Fig. 3 is a perspective view of the lower portion of the device, also enlarged.

A foot 10, consisting of a strap or ribbon-spring curved to semicircular form, is attached at its rear end to a shank 11, which shank has its upper end secured in any suitable form of handle 12. The outer or forward end of the spring-foot 10 is curved downward, as illustrated at $a$ in Fig. 3, and the said downwardly-curved end is provided with a recess 13, as also best illustrated in said Fig. 3. The shank 11 is curved downward over and concentric with the upper face of the spring-foot 10, and the lower or outer end of the shank is curved upward, as best shown in Fig. 2, and made to terminate in an eye 14. In an offset formed upon the shank 11, at or near its center, one end of a rectangular frame 15 is pivoted, the outer end of the said frame being roughened or serrated upon its upper face to form a jaw $b$, and in connection with the frame 15 an upper jaw $b'$ is employed, which jaw is journaled or pivoted upon the frame 15, preferably through the medium of a pin 16, passing through the frame and upper jaw, as best shown in Fig. 3. The upper jaw $b'$ is provided with a downwardly-extending hook-like rear extension 17, which extension passes through the eye 14 of the upturned end of the shank 11. The upper jaw $b'$ is held out of contact with the jaw $b$ of the frame 15 by means of a spring 18, which spring may be attached to the jaw $b'$ in any suitable manner. In the drawings the spring consists of a wire coiled around one side member of the frame 15, around the pin 16, and likewise around one side member of the upper jaw $b'$.

Upon the pin 16, at its center, a presser-bar 19 is fulcrumed, one end of which bar extends rearward beyond the pin and passes through an eye 20, formed in the upper end of a bow-spring 21, said spring being attached at its forked lower end to the upper face of the spring-foot 10. The outer end of the presser-bar 19 is made to terminate in a loop-section 22.

When the device is not in use, the parts are held in position as shown in Fig. 2, in which it will be observed that by reason of the spring 18 the jaws $b$ and $b'$ are held quite a distance apart, and the said jaws, and likewise the presser-bar, are retained in a horizontal position.

In operation, to button a shoe, the fly 23 of the shoe is made to enter between the jaws $b$ and $b'$, and the spring-foot 10 is thereby passed beneath the fly, and the shank of the button is made to enter the recess 13 in the outer or forward end of the said foot. The handle 12 of the device is then carried over the fly, whereby the radii of the spring-foot 10 is shortened, and as the radii is thus shortened and the spring-foot compressed, the lower curved end of the shank 11 acts upon the rear projection 17 of the upper jaw $b'$, causing the said jaw to close down upon the fly, and the upper end of the bow-spring 21, acting upon the rear end of the presser-bar 19, forces the loop end of the said bar firmly down against the upper surface of the fly, the loop of the presser-bar being located immediately above and surrounding the button-hole through which the button is to be passed. The flexing of the spring-foot 10 causes the jaws to move slightly outward, whereby the fly is pulled well over the button, and as the button acts as a brace or fulcrum to contract the spring-foot 10 the said foot in contracting forces the button upward through the button-hole, the loop 22 of the presser-bar holding the button-hole in a favorable position to receive the button by pressing the said button-hole downward. This button having been fastened in the fly, the handle 12 is allowed to assume its normal position, whereupon the spring 18 acting causes the jaws $b$ and $b'$ to open, and as the spring-foot 10 assumes its normal position the jaws and presser-bar are likewise brought to their normal positions, whereupon, without removing the fly from between the jaws $b$ and $b'$, the device may be slipped upward to manipulate the next button.

Having thus described my invention, I claim as new and desire to secure by Letters Patent—

1. In a shoe-buttoner, the combination of a spring-foot, a shank attached to the said foot, gripping-jaws attached to the said shank, a presser-bar journaled above the gripping-jaws and extending over the same, and means, substantially as shown and described, for operating the jaws and the presser-bar when the foot is contracted, as and for the purpose specified.

2. In a shoe-buttoner, the combination, with a spring-foot having a downwardly-curved outer end and a recess in said end, a shank secured to the opposite end of the spring-foot provided with an upwardly-turned lower extremity, and a bow-spring attached to the said foot terminating at its upper end in an eye, of gripping-jaws attached to the shank, the upper member of which jaw is provided with a projection extending through the upturned end of the shank, and a presser-bar terminating in a loop pivoted above and extending beyond the jaws, one end of which presser-bar passes through the eye of the said bow-spring, substantially as and for the purpose specified.

3. As an improved article of manufacture, a shoe-buttoner comprising a curved spring-foot having a downwardly-turned recessed outer end, a shank attached to the opposite end of the foot, gripping-jaws attached to the shank, one of which jaws is spring-pressed, a presser-bar terminating in a loop pivoted above the gripping-jaws, and means, substantially as shown and described, for operating the presser-bar and the upper spring-pressed member of the gripping-jaws simultaneously with the compressing of the foot, as and for the purpose specified.

JAMES CLARENCE MURRAY.

Witnesses:
C. E. SEARS,
D. A. FORT.